Aug. 27, 1963 L. K. CARROLL ET AL 3,101,758
CITRUS FRUIT JUICER
Filed Aug. 1, 1960
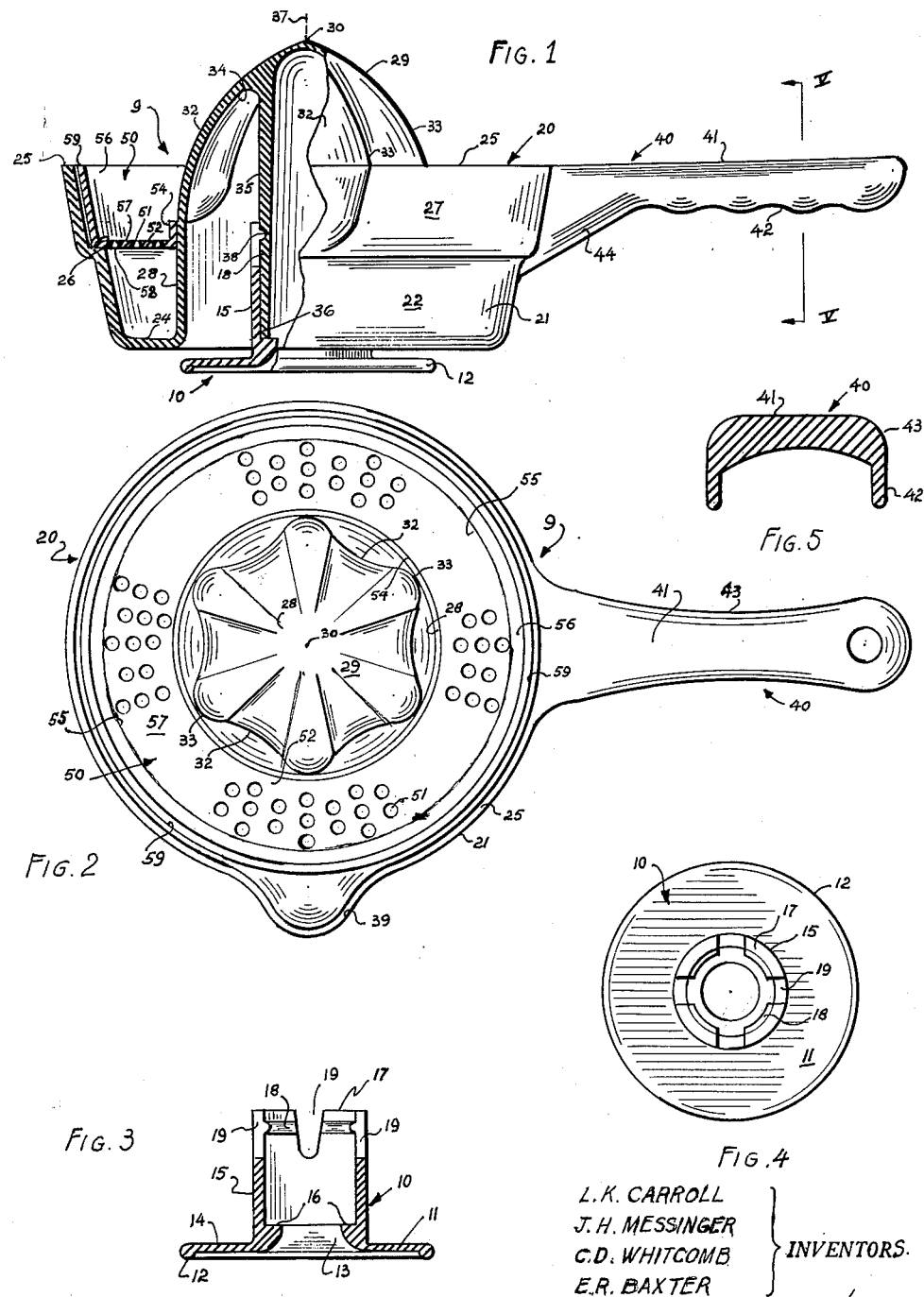
L.K. CARROLL
J.H. MESSINGER
C.D. WHITCOMB
E.R. BAXTER
INVENTORS.
BY
ATTORNEY.

3,101,758
CITRUS FRUIT JUICER
Lawrence K. Carroll, Joseph H. Messinger, Charles D. Whitcomb, and Earl R. Baxter, all of Fremont, Ohio, assignors to Quikut, Inc., Fremont, Ohio, a corporation of Ohio
Filed Aug. 1, 1960, Ser. No. 46,674
3 Claims. (Cl. 146—3)

This invention relates to citrus fruit juicers, and more particularly it relates to improvements in manually operated domestic citrus fruit juicers.

In the prior art there are two general types of fruit juicers known. The first type are those relatively complex devices utilizing electrically driven reamers or mechanically operated pressing members, which devices are correspondingly expensive, cumbersome, and difficult to clean and store since they are of more or less permanent installation. The second and more common type of juicers includes the comparatively simple one piece glass or plastic juicers on which the fruit half is manually turned on a stationary projecting reamer of the juicer. This type of juicer is generally inexpensive, simple, and easy to clean and store, but since the juicing operation requires that the fruit half be manually twisted or turned on the reamer thereof, the juicing operation practiced with these devices is relatively slower and more tiresome than with the juicers of the first mentioned type.

In recent years an improvement in this second type of juicer has been made wherein the reamer of the juicer has been made movable upon a base pivot so that the fruit half may be held stationary and the reamer moved relative to the fruit half. Use of this improved juicer means that an easier and faster juicing operation may be practiced. However, in the past even these improved juicers were subject to some inconvenient features as, for instance, the parts being permanently connected so that satisfactory cleaning of the juicer was impossible or, on the other hand, the parts are freely dissociable for cleaning so that often parts of the juicer become lost and the juicer becomes useless.

It is an object of this invention to provide a simple, safe, sanitary, economic, effective and efficient citrus fruit juicer with an improved or movable reamer.

It is another object of this invention to provide such an improved juicer in which the component parts are easily dissociable for cleaning of the juicer.

It is another object of this invention to provide in such an improved juicer the means whereby the dissociable components of the juicer may be held together to prevent them from easily becoming separated and lost.

Generally speaking, the fruit juicer of this invention comprises at least two and not more than three plastic molded parts or pieces. These are a pivot providing base element, an integral handling juice receptacle and reamer for pivotally mounting on the base, and, if desired, a removable seed and pulp strainer which may nest in the receptacle over and around the reamer on a ledge built into the outer wall of the annular juice receptacle around the reamer. The base element may consist of a base supporting disc and a central pedestal, which may be hollow, and which has one part of a flexible friction groove and rib combination cooperable with the other part inside the reamer portion of the juice receptable member. This pedestal journals a downwardly projecting shaft sleeve, or socket inside or extending from the hollow interior of the reamer. This shaft has circumferential flexible friction rib or groove part in its surface for cooperating with the groove or rib of the base pedestal to maintain these two parts together in a connection which is easily dismantled so that the juicer may be cleaned. The strainer may be in the form of a annular trough having flanged outer walls or rims and a foraminous bottom, with the reamer of the receptacle projecting through the central opening of the strainer when the strainer is nested on its supporting ledge in the receptacle.

The above mentioned and other features and objects of this invention and the manner of attaining them will become more apparent and the invention itself will be understood best by reference to the following description of an embodiment of the invention taken in conjunction with the accompanying drawings, wherein:

FIG. 1 is a side view of one embodiment of the assembled citrus fruit juicer of this invention with parts thereof being broken away to illustrate the assembly of the juice receptacle on the base element and the nesting of the seed and pulp strainer on the offset ledge of the outer wall of the juice receptacle;

FIG. 2 is a plan view of the assembled juicer, as would be seen looking downwardly on FIG. 1, showing the foraminous strainer nested in the juice receptacle around the fruit reamer and further showing a juice pouring spout at one side of the receptacle;

FIG. 3 is a vertical sectional view of the base element, shown partially in FIG. 1, showing an inner annular rib thereon and notches in its outer end to permit flexing;

FIG. 4 is a top plan view of the juicer base element shown in section in FIG. 3; and FIG. 5 is an enlarged transverse cross-sectional view of the handle of the juicer taken along line V—V of FIG. 1.

More specifically, in the juicer 9 of this invention the base element 10 (FIGS. 1, 3, and 4) may comprise a circular disc 11 which may have a ribbed or beaded periphery 12 and a central opening 13. Extending perpendicularly from the upper surface 14 of the disc 11 may be an integrally formed hollow pedestal or sleeve 15 concentric with opening 13 with an interior shoulder or stop 16 inside the sleeve 15 adjacent the disc opening 13. Below the open upper end 17 of the sleeve 15 on the interior of sleeve 15 may be an annular groove or rib 18 as shown. A plurality of notches or indentations 19 may extend downwardly from the top 17 of the sleeve 15 to terminate below the interior annular groove or rib 18 to provide for resilient flexing of the top portions of the base sleeve 15 when the juice receptacle 20 is mounted or demounted on the base 10. The base element 10 may be made of any acid resisting plastic material, but in the preferred form described herein it is molded of a polymerized plastic having some measure of inherent resilience, such as polyethylene or the like.

The largest sized component of the juicer 9 is the juice receptacle 20 (FIGS. 1 and 2) which combines many of the features of this invention. Basically the receptacle 20 is a bowl 21 having upwardly extending near-vertical walls 22 with a slight outward flare. About midway between the bottom 24 of the bowl 21 and the upper edge 25 of the walls 22, there may be provided an inwardly projecting supporting means, such as an upwardly opening ledge or seat 26 on the interior of the bowl 21, which may be affected by an outwardly offset portion 27 of the walls 22.

Centrally of the receptacle 20, the bottom 24 of bowl 21 is raised to form a central cylindrical portion 28 terminating upwardly above the rim 25 of the bowl 21 in a dome forming a reamer 29 having a hollow interior with the apex 30 of the dome or reamer 29 over the center of the bowl 21 (FIG. 1). As the cylindrical portion 28, at the lower portion of the reamer 29, begins to close toward the apex 30 above the level of the receptacle sidewall ledge 26, vertical indentations or flutes 32 are made in the reamer 29 which result in ridges 33 in the reamer surface; these ridges 33 are the means by which juice may be forced from a prepared citrus fruit half.

From the hollow underside 34 of the reamer dome 29 a shaft or sleeve 35 extends downwardly concentric with the axis 37 of the reamer 29. This shaft 35 may be hollow and may have its lower end 36 adjacent the bottim 24 of the receptacle bowl 21. At a distance above the lower end 36 of the shaft 35 equal to the distance between the base rib 18 and shoulder 16, the shaft 35 has a circumferential rib or groove 38 which cooperates with the annular groove or rib 18 of the base member 10 (FIG. 1). The length of the shaft 35 and the height of the shoulder 16 should be such that when the shaft end 36 rests on the shoulder 16, the lower surface of the bottom 24 of the annular receptacle will be above the upper surface 14 of the base 11 to permit free relative movement between the base member or part 10 and receptacle member or part 20.

A pouring spout 39 may be formed in the wall 22 of the receptacle bowl 21 at its rim 25.

Extending perpendicularly from the outer surface of the receptacle 20, preferably at 90° from the pouring spout 39, and integral therewith, there is a radially extending lever handle 40 which may have its upper surface 41 flush with the rim 25 of the bowl 21. A cross-sectional view of the handle 40 (FIG. 5) discloses that the handle 40 may have a depending longitudinal flange 42 along each side 43 wherein each flange 42 may be configured or scalloped to provide improved grasping properties. In order to strengthen the connection of the handle 40 to the bowl 21, a gusset 44 may be formed between the flanges 42 of the handle 40 and the bowl 21.

As was the case with the base element 10, the receptacle member 20 may be fabricated of any convenient workable material, but in the preferred form of the invention the receptacle is fabricated of molded polyethylene plastic, similar or the same as that of the base 10.

In addition to the required base member 10 and receptacle 20 described above, the apparatus of this invention may include a seed and pulp strainer 50 which preferably takes the form of an annular trough. The strainer 50 has a foraminous or perforated 51 bottom 52 encompassing a central aperture 53 (FIGS. 1 and 2). Adjacent the aperture 53, the strainer 50 may have an upwardly extending short flange 54, wherein the distance across the aperture 53 from flange 54 to flange 54 is slightly greater than the outer diameter of the lower reamer cylindrical portion 28. Around the outer periphery 55 of the strainer 50, an outwardly flaring upwardly extending flange 56 may be formed integral with the upper surface 57 of the strainer 50. The distance from the bottom surface 58 of the strainer to the upper end 59 of the flange 56 should be equal approximately to the distance from the receptacle wall ledge 26 to the receptacle rim 25. The foramina or perforations 51 in the strainer bottom 52 have a smaller diameter at the upper surface 57 of the strainer 50 than at the strainer lower surface 58 to prevent seeds, from the fruit juiced, becoming wedged in these perforations 51.

In use, the strainer 50 may be nested in the receptacle 20 with its outer peripheral edge 55 resting on receptacle ledge 26 and with its central flange 54 surrounding and adjacent the reamer cylinder 28 just at the base of reamer dome 29 and below the flutings 32 in said dome 29.

Preferably, the strainer 50 is fabricated of the same material as the base 10 and juice receptacle 20.

In the operation of the juicer 9, the device is assembled by inserting the receptacle shaft 35 into the hollow base sleeve 15 so that the lower end 36 of the shaft 35 abuts the shoulder 16 and the sleeve rib 18 is engaged in the shaft groove 38 by the resilient chuck-type action of the upper end 17 of the base sleeve 15. In this assembled position, the receptacle 20 may be oscillated, rotated or pivoted easily about the base 10 and if the receptacle 20 is lifted the base 10 will not fall off of its own weight. The strainer 50 may be nested in the receptacle 20 around the reamer 29 as described above.

To juice a lemon, lime, orange or grapefruit half, the operator may use one hand to press the fruit half upside-down on the reamer 29 and may use the other hand to grasp the receptacle lever handle 40. In this manner the operator may easily oscillate or pivot the receptacle 20 and integral reamer 29 under the fruit half to produce relative motion between the fruit and the reamer 29, instead of using the old tiresome method of having the reamer 29 stationary and both pressing and twisting the fruit half on the reamer by hand. Since there is no tiresome wrist motion required with this juicer 9, many more fruits may be juiced in less time with the same amount of physical exertion.

After a juicing operation and the juice is poured from the annular trough of the juice receptacle 20 through the spout 39, if it is desired to clean the juicer, the strainer 50 may be lifted out of the annular juice receptacle 20 and emptied and the pivot base 10 also may be snapped from the receptacle 20 simply by pulling the base 10 relative to the receptacle 20 against the resilient chuck action of the base sleeve 15 to disengage the cooperating rib and groove 18 and 38 between pedestal 15 and shaft 35.

While there is described above the principles of this invention in connection with specific apparatus, it is to be clearly understood that this description is made only by way of example and not as a limitation to the scope of this invention.

What is claimed is:
1. A citrus fruit juicer comprising:
   A. a moldable plastic base member comprising
      1. a lower supporting portion, and
      2. an upper integral pedestal portion;
   B. a molded plastic reamer and receptacle member comprising
      1. a dome shaped reamer integral with and projecting upwardly from the center of an annular trough shaped receptacle,
      2. a radially extending handle integral with a side of said trough,
      3. a central shaft portion within and extending downwardly from the apex of said reamer for cooperating with said pedestal portion,
      4. a shoulder bearing means bewteen said shaft and said pedestal portion to permit free relative rotary movement therebetween,
      5. means to restrict free relative axial movement between said members comprising
         (a) an interfitting rib element and annular groove element, one located on each said member, and
         (b) slits in the wall of one of said pedestal and shaft portions to permit flexing of said wall for engaging and disengaging said interfitting rib and groove elements,
      6. an inwardly projecting supporting ledge circumferentially of the interior of the outer wall of said annular trough shaped receptacle; and
   C. a removable molded plastic seed and pulp strainer insertable in said receptacle comprising an annular trough having:
      1. an upwardly extending outer wall,
      2. a central aperture,
      3. an upwardly extending flange around said aperture, and
      4. a foraminous bottom,
         wherein said strainer is supported in said receptacle on said ledge of said wall of said receptacle with said reamer projecting through and above said aperture with said flange around said aperture in said strainer cooperating with said reamer.
2. A citrus fruit juicer according to claim 1 wherein said annular trough shaped receptacle includes an integral spout in one side thereof.

3. A citrus fruit juicer according to claim 1 wherein the foraminae in said strainer comprise apertures larger at their lower than their upper ends.

References Cited in the file of this patent

UNITED STATES PATENTS

| | | |
|---|---|---|
| 2,487,371 | Quam | Nov. 8, 1949 |
| 2,533,811 | Jepson | Dec. 12, 1950 |
| 2,719,524 | Brinkley | Oct. 4, 1955 |